US012689285B2

(12) United States Patent
Morisaki et al.

(10) Patent No.: US 12,689,285 B2
(45) Date of Patent: Jul. 21, 2026

(54) GATE DRIVE CIRCUITRY AND POWER CONVERTER

(71) Applicant: Mitsubishi Electric Corporation

(72) Inventors: Shota Morisaki, Tokyo (JP);
Takayoshi Miki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 169 days.

(21) Appl. No.: 18/841,228

(22) PCT Filed: Mar. 10, 2022

(86) PCT No.: PCT/JP2022/010697
§ 371 (c)(1),
(2) Date: Aug. 23, 2024

(87) PCT Pub. No.: WO2023/170885
PCT Pub. Date: Sep. 14, 2023

(65) Prior Publication Data
US 2025/0167663 A1 May 22, 2025

(51) Int. Cl.
*H02M 1/08* (2006.01)
*H02M 1/32* (2007.01)
*H02M 7/5387* (2007.01)

(52) U.S. Cl.
CPC ............. *H02M 1/08* (2013.01); *H02M 1/327* (2021.05); *H02M 7/5387* (2013.01)

(58) Field of Classification Search
CPC ....... H02M 1/08; H02M 1/327; H02M 7/5387
See application file for complete search history.

(56) References Cited

U.S. PATENT DOCUMENTS

2009/0164196 A1* 6/2009 Saitou ................... G06F 30/367
703/14
2016/0087422 A1* 3/2016 Mourrier ................ H02H 7/122
361/101
(Continued)

FOREIGN PATENT DOCUMENTS

JP 2020058192 A 4/2020

OTHER PUBLICATIONS

International Search Report (PCT/ISA/210) with translation and Written Opinion (PCT/ISA/237) mailed on May 17, 2022, by the Japan Patent Office as the International Searching Authority for International Application No. PCT/JP2022/010697. (12 pages).

*Primary Examiner* — Jue Zhang
(74) *Attorney, Agent, or Firm* — BUCHANAN, INGERSOLL & ROONEY PC

(57) ABSTRACT
A controller of a gate drive circuitry includes: a Vsd table indicating a first voltage, which is a voltage between a drain terminal and a source terminal, in a correspondence between a first current and a first junction temperature; and a Vsd table indicating the first voltage in a correspondence between a second current and a second junction temperature. The first and second currents are currents flowing when a semiconductor switching element is in an asynchronous rectification state and a synchronous rectification state, respectively. The first and second junction temperatures are junction temperatures when the first and second currents flow through the semiconductor switching element, respectively. The controller uniquely specifies a junction temperature of the semiconductor switching element from the Vsd table by using two detection values of the first voltage detected individually in the asynchronous rectification state and the synchronous rectification state.

12 Claims, 6 Drawing Sheets

(56)                   References Cited

U.S. PATENT DOCUMENTS

| | | | |
|---|---|---|---|
| 2019/0007039 A1* | 1/2019 | Narumi | H02M 7/537 |
| 2019/0204889 A1* | 7/2019 | Kaeriyama | H02M 1/32 |
| 2020/0235731 A1* | 7/2020 | Wang | H03K 17/18 |

* cited by examiner

DRIVE SIGNAL
(UPPER ARM)

DRIVE SIGNAL
(LOWER ARM)

DEAD TIME　　　DEAD TIME

DURING
SYNCHRONOUS
RECTIFICATION
STATE

DURING
ASYNCHRONOUS
RECTIFICATION
STATE

6

CURRENT
FLOW PATH

4b

Vsd TABLE (DURING ASYNCHRONOUS RECTIFICATION STATE) 41

|     | Tj1  | Tj2  | Tj3  | ... | TjN  |
|-----|------|------|------|-----|------|
| Id1 | Vx11 | Vx12 | Vx13 | ·· | Vx1N |
| Id2 | Vx21 | Vx22 | Vx23 | ·· | Vx2N |
| Id3 | Vx31 | Vx32 | Vx33 | ·· | Vx3N |
| :   | :    | :    | :    |    | :    |
| IdN | VxN1 | VxN2 | VxN3 | ·· | VxNN |

Vsd TABLE (DURING SYNCHRONOUS RECTIFICATION STATE) 42

|     | Tj1  | Tj2  | Tj3  | ... | TjN  |
|-----|------|------|------|-----|------|
| Id1 | Vy11 | Vy12 | Vy13 | ·· | Vy1N |
| Id2 | Vy21 | Vy22 | Vy23 | ·· | Vy2N |
| Id3 | Vy31 | Vy32 | Vy33 | ·· | Vy3N |
| :   | :    | :    | :    |    | :    |
| IdN | VyN1 | VyN2 | VyN3 | ·· | VyNN |

FIG.8

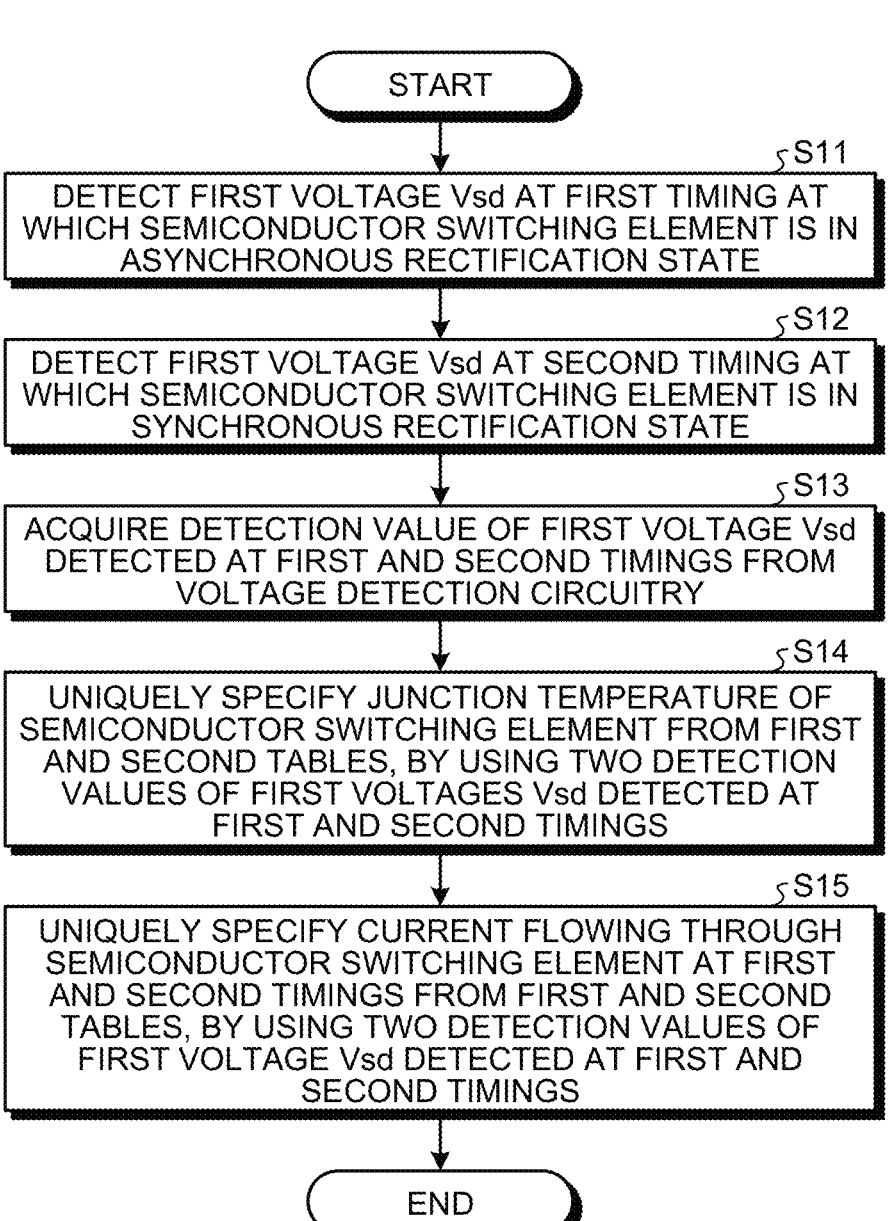

START

S11
DETECT FIRST VOLTAGE Vsd AT FIRST TIMING AT WHICH SEMICONDUCTOR SWITCHING ELEMENT IS IN ASYNCHRONOUS RECTIFICATION STATE

S12
DETECT FIRST VOLTAGE Vsd AT SECOND TIMING AT WHICH SEMICONDUCTOR SWITCHING ELEMENT IS IN SYNCHRONOUS RECTIFICATION STATE

S13
ACQUIRE DETECTION VALUE OF FIRST VOLTAGE Vsd DETECTED AT FIRST AND SECOND TIMINGS FROM VOLTAGE DETECTION CIRCUITRY

S14
UNIQUELY SPECIFY JUNCTION TEMPERATURE OF SEMICONDUCTOR SWITCHING ELEMENT FROM FIRST AND SECOND TABLES, BY USING TWO DETECTION VALUES OF FIRST VOLTAGES Vsd DETECTED AT FIRST AND SECOND TIMINGS

S15
UNIQUELY SPECIFY CURRENT FLOWING THROUGH SEMICONDUCTOR SWITCHING ELEMENT AT FIRST AND SECOND TIMINGS FROM FIRST AND SECOND TABLES, BY USING TWO DETECTION VALUES OF FIRST VOLTAGE Vsd DETECTED AT FIRST AND SECOND TIMINGS

END

GATE DRIVE CIRCUITRY AND POWER CONVERTER

FIELD

The present disclosure relates to a gate drive circuitry that drives a semiconductor switching element incorporating at least one of an antiparallel diode or a body diode, and a power converter including the gate drive circuitry.

BACKGROUND

Patent Literature 1 below discloses an overcurrent protection circuitry for protecting a switching element by estimating an overcurrent that can flow through the switching element on the basis of: a detection value of a temperature sensor that detects a temperature of the semiconductor switching element; and a detection value of a voltage value between main terminals when the switching element is ON.

The method described in Patent Literature 1 is a method of: estimating an ON-resistance of the semiconductor switching element by using a detection value of the temperature sensor; and estimating a current flowing through the semiconductor switching element on the basis of the estimated ON-resistance. Patent Literature 1 describes that the temperature sensor is provided on a chip of the semiconductor switching element, a package on which the chip is installed, or a heat sink to which the package is attached.

CITATION LIST

Patent Literature

Patent Literature 1: Japanese Patent Application Laid-open No. 2020-058192

SUMMARY OF INVENTION

Problem to be Solved by the Invention

However, the heat sink and the package on which the temperature sensor is installed have a thermal time constant. Therefore, a temperature difference occurs between a temperature of the semiconductor switching element and a detection value of the temperature sensor. Due to this temperature difference, when the temperature sensor detects an anomaly, the temperature of the semiconductor switching element may exceed a maximum rated temperature. Therefore, in this method, control of overtemperature detection or overcurrent detection cannot be performed in time, and there is a concern that the semiconductor switching element may be damaged in the worst case. In addition, in order to reliably prevent damage to the semiconductor switching element, a design with a large margin is required, and there is also a problem that performance of the semiconductor switching element cannot be effectively utilized.

From the above, a method of accurately estimating a temperature of the semiconductor switching element or a current flowing through the semiconductor switching element and driving the semiconductor switching element has been desired.

The present disclosure has been made in view of the above, and an object thereof is to obtain a gate drive circuitry capable of accurately estimating a temperature of a semiconductor switching element or a current flowing through the semiconductor switching element and driving the semiconductor switching element.

Means to Solve the Problem

To solve the above-described problem and achieve the object, a gate drive circuitry according to the present disclosure is a gate drive circuitry configured to drive a semiconductor switching element. The gate drive circuitry includes a gate terminal, a drain terminal, and a source terminal, and the gate drive circuitry incorporates at least one of an antiparallel diode or a body diode. The gate drive circuitry includes: a voltage detection circuitry, a controller, and a gate driver. The voltage detection circuitry is configured to detect a first voltage that is a voltage between the drain terminal and the source terminal. The controller is configured to generate a drive signal for driving the semiconductor switching element. The gate driver is configured to: generate a drive voltage for driving the semiconductor switching element based on the drive signal; and apply the drive voltage to the gate terminal. The controller includes: a first table and a second table. The first table is a table indicating the first voltage in a correspondence between a first current and a junction temperature, the first current being a flow from the source terminal to the drain terminal when the semiconductor switching element is in an asynchronous rectification state, and the junction temperature being temperature of the semiconductor switching element when the first current flows in the semiconductor switching element. The second table is a table indicating the first voltage in a correspondence between a second current and a junction temperature, the second current being a flow from the source terminal to the drain terminal when the semiconductor switching element is in a synchronous rectification state, and the junction temperature being temperature of the semiconductor switching element when the second current flows in the semiconductor switching element. The voltage detection circuitry is configured to: detect the first voltage at a first timing at which the semiconductor switching element is in the asynchronous rectification state; and detect the first voltage at a second timing at which the semiconductor switching element is in the synchronous rectification state. The controller is configured to perform processing of uniquely identifying at least one of a junction temperature of the semiconductor switching element and a current flowing through the semiconductor switching element at the first and second timings from the first and second tables, by using two detection values of the first voltage detected at the first and second timings.

Effects of the Invention

The gate drive circuitry according to the present disclosure has an effect of being able to accurately estimate a temperature of the semiconductor switching element or a current flowing through the semiconductor switching element to drive the semiconductor switching element.

BRIEF DESCRIPTION OF DRAWINGS

FIG. 8 is a flowchart for explaining estimation processing of a junction temperature and a current performed by the gate drive circuitry according to the embodiment.

DESCRIPTION OF EMBODIMENTS

Hereinafter, a gate drive circuitry and a power converter according to an embodiment of the present disclosure will be described in detail with reference to the accompanying drawings. Note that, in the following embodiment, a case will be described as an example in which a power conversion main circuitry in the power converter is an inverter circuitry, but it is not intended to exclude application to circuitries of other types or purposes. The power conversion main circuitry may be a servo amplifier circuitry, a switching power supply circuitry, or a converter circuitry. Further, hereinafter, physical connection and electrical connection will not be distinguished from each other, and will be simply referred to as "connection". That is, the term "connection" includes both a case where components are directly connected to each other and a case where components are indirectly connected to each other via another component.

Embodiment

Figure 1:
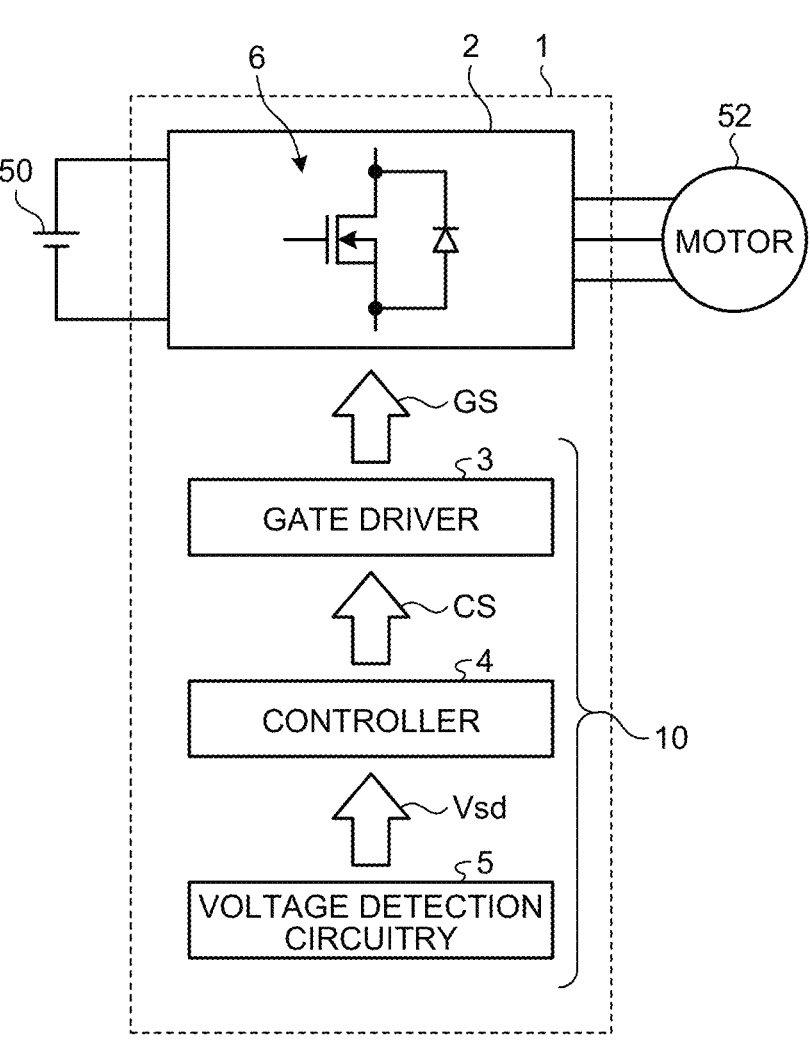
FIG. 1 is a diagram illustrating an exemplary configuration of a power converter including a gate drive circuitry according to an embodiment.
Figure 2:
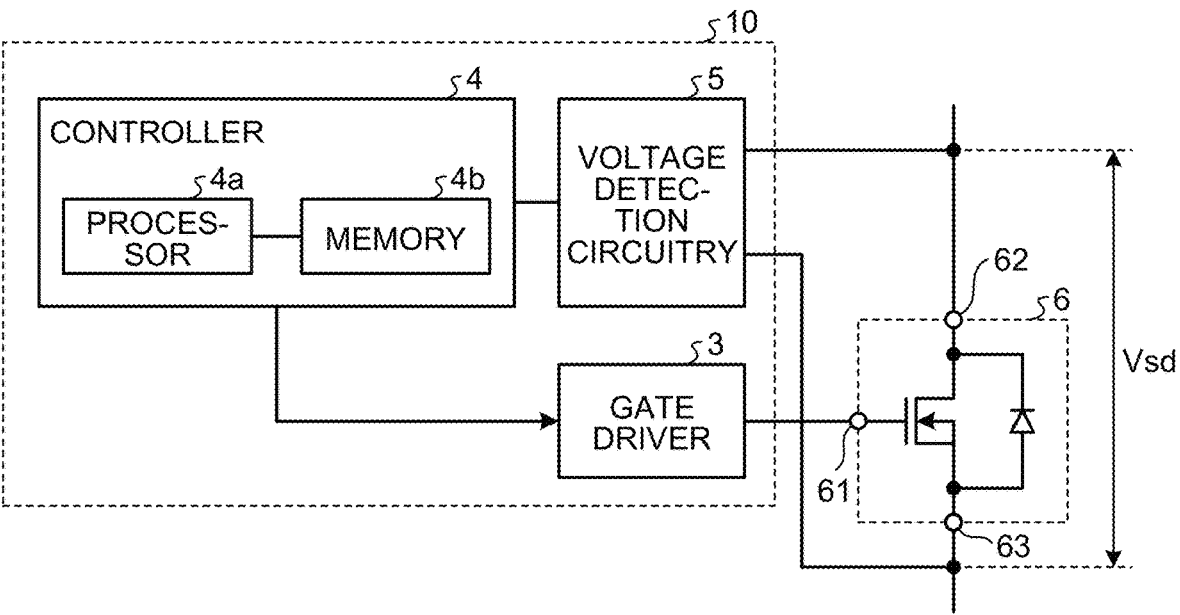
FIG. 2 is a diagram illustrating a connection relationship between the gate drive circuitry and a semiconductor switching element as a driving target, according to the embodiment.
Figure 3:
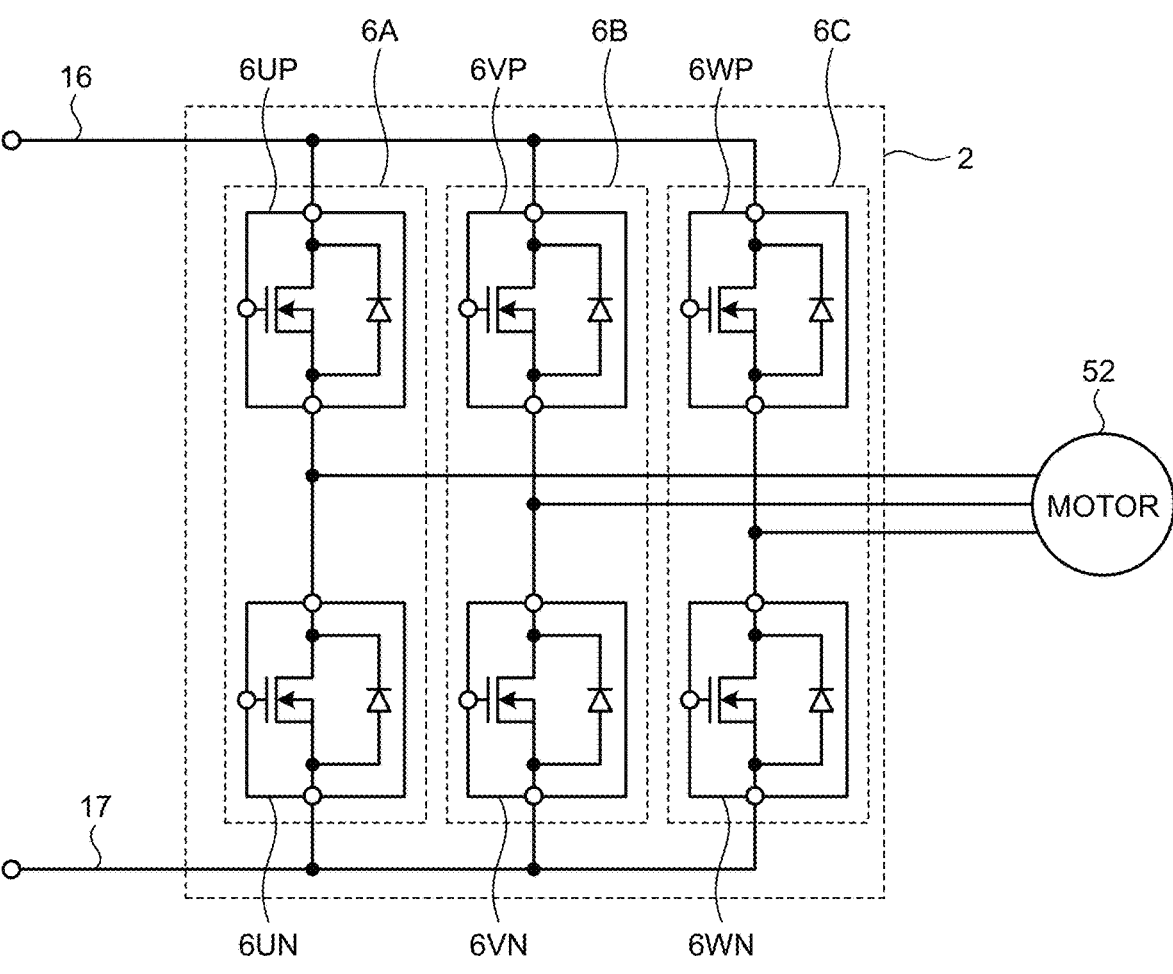
FIG. 3 is a circuitry diagram illustrating an exemplary configuration of an inverter circuitry illustrated in FIG. 1.

FIG. 1 is a diagram illustrating an exemplary configuration of a power converter 1 including a gate drive circuitry 10 according to an embodiment. FIG. 2 is a diagram illustrating a connection relationship between the gate drive circuitry 10 and a semiconductor switching element 6 as a driving target, according to the embodiment. FIG. 3 is a circuitry diagram illustrating an exemplary configuration of an inverter circuitry 2 illustrated in FIG. 1.

In FIG. 1, the power converter 1 according to the embodiment includes the inverter circuitry 2 and the gate drive circuitry 10. Further, the gate drive circuitry 10 includes a gate driver 3, a controller 4, and a voltage detection circuitry 5. A DC power supply 50 is connected to input terminals of the inverter circuitry 2. The DC power supply 50 is a supply source of DC power for applying a DC voltage to the inverter circuitry 2, and corresponds to a power supply device, a converter, a power capacitor, and the like.

The inverter circuitry 2 is a power conversion circuitry that converts DC power supplied from the DC power supply 50 to AC power. The inverter circuitry 2 includes at least one semiconductor switching element 6. An example of the semiconductor switching element 6 is a metal-oxide-semiconductor field-effect transistor (MOSFET) as illustrated in FIG. 1. A diode connected in antiparallel is connected between a source and a drain of the MOSFET. Here, antiparallel is a connection form in which an anode of the diode is connected to the source of the MOSFET and a cathode of the diode is connected to the drain of the MOSFET. Hereinafter, this diode is referred to as an "antiparallel diode".

An example of the antiparallel diode is a Schottky barrier diode (SBD), but a diode other than the SBD may be used. Further, the antiparallel diode may be a parasitic diode included in the MOSFET. The parasitic diode is also referred to as a body diode. However, the semiconductor switching element 6 assumed in the embodiment is assumed to include the antiparallel diode formed together with the MOSFET. That is, the gate drive circuitry 10 according to the embodiment is a gate drive circuitry that drives the semiconductor switching element 6 incorporating at least one of the antiparallel diode or the body diode.

Note that, although not illustrated in FIG. 2, a load, a power capacitor, a reactor, or another module is connected to ends of a drain terminal 62 and a source terminal 63 of the semiconductor switching element 6. When an electric signal is applied between a gate terminal 61 and the source terminal 63 of the semiconductor switching element 6, the semiconductor switching element 6 is switched between an ON state and an OFF state according to the electric signal, and performs switching operation. The power converter 1 performs power conversion processing in accordance with the switching operation of the semiconductor switching element 6.

One gate drive circuitry 10 is provided for one semiconductor switching element 6. The voltage detection circuitry 5 detects a first voltage Vsd that is a voltage between the drain terminal 62 and the source terminal 63 of the semiconductor switching element 6. The controller 4 generates a drive signal CS for driving a gate of the semiconductor switching element 6 and outputs the drive signal CS to the gate driver 3. An example of the drive signal CS is a pulse width modulation (PWM) signal. The gate driver 3 generates a drive voltage GS for driving the semiconductor switching element 6 on the basis of the drive signal CS, and applies the drive voltage GS to the gate terminal 61. Note that, in the present embodiment, a detection value of the first voltage Vsd detected by the voltage detection circuitry 5 is used for generating or outputting the drive signal CS. Details of this processing will be described later.

A processor 4a is an arithmetic means called a microprocessor, a microcomputer, a central processing unit (CPU), or a digital signal processor (DSP). Further, a memory 4b is a storage unit.

The memory 4b stores a program to be read by the processor 4a, parameters to be referred to by the processor 4a, data obtained by processing of the processor 4a, and the like. In addition, table data to be described later is stored in the memory 4b. Further, the memory 4b is also used as a work area when the processor 4a performs arithmetic processing. The memory 4b is generally a nonvolatile or volatile semiconductor memory such as a random access memory (RAM), a flash memory, an erasable programmable ROM (EPROM), or an electrically EPROM (EEPROM) (registered trademark)).

Returning to FIG. 1, a motor 52 as a load is connected to output terminals of the inverter circuitry 2. The motor 52 is driven by AC power supplied from the inverter circuitry 2.

As illustrated in FIG. 3, the inverter circuitry 2 includes a leg 6A, a leg 6B, and a leg 6C. The leg 6A, the leg 6B, and the leg 6C are connected in parallel to each other between a DC bus 16 and a DC bus 17. The leg 6A is a series circuit unit in which a semiconductor switching element 6UP of a U-phase upper arm and a semiconductor switching element 6UN of a U-phase lower arm are connected in series. The leg 6B is a series circuit unit in which a semiconductor switching element 6VP of a V-phase upper arm and a semiconductor switching element 6VN of a V-phase lower arm are connected in series. The leg 6C is a series circuit unit in which a semiconductor switching element 6WP of a W-phase upper arm and a semiconductor switching element 6WN of a W-phase lower arm are connected in series. That is, the inverter circuitry 2 is a bridge circuitry including three legs as a series circuit unit.

Note that, in FIGS. 1 and 3, the motor 52 serving as a load is a three-phase motor, but is not limited thereto. The motor 52 may be a single-phase motor. In a case where the motor 52 is a single-phase motor, a single-phase inverter circuitry is used. The single-phase inverter circuitry includes a single-phase bridge circuitry including two legs as a series circuit unit.

Further, in FIGS. 1 and 3, the load is a motor, but is not limited thereto. The load may be a rechargeable storage battery. In a case where the load is a storage battery, a direct current to direct current (DCDC) converter is used instead of the inverter circuitry 2. A minimum configuration of the DCDC converter is a half bridge circuitry including one leg.

Figure 4:
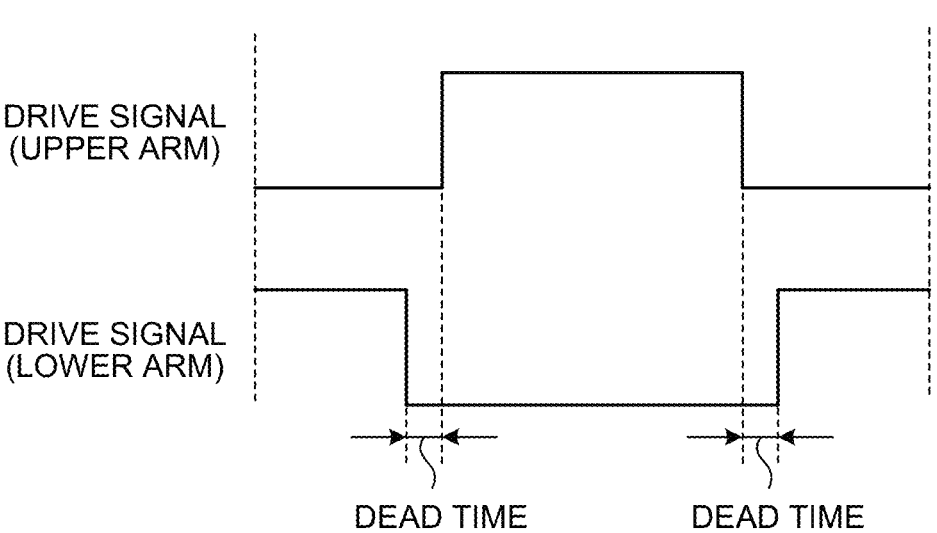
FIG. 4 is a diagram illustrating an example of a drive signal generated by the gate drive circuitry according to the embodiment.
Figure 5:
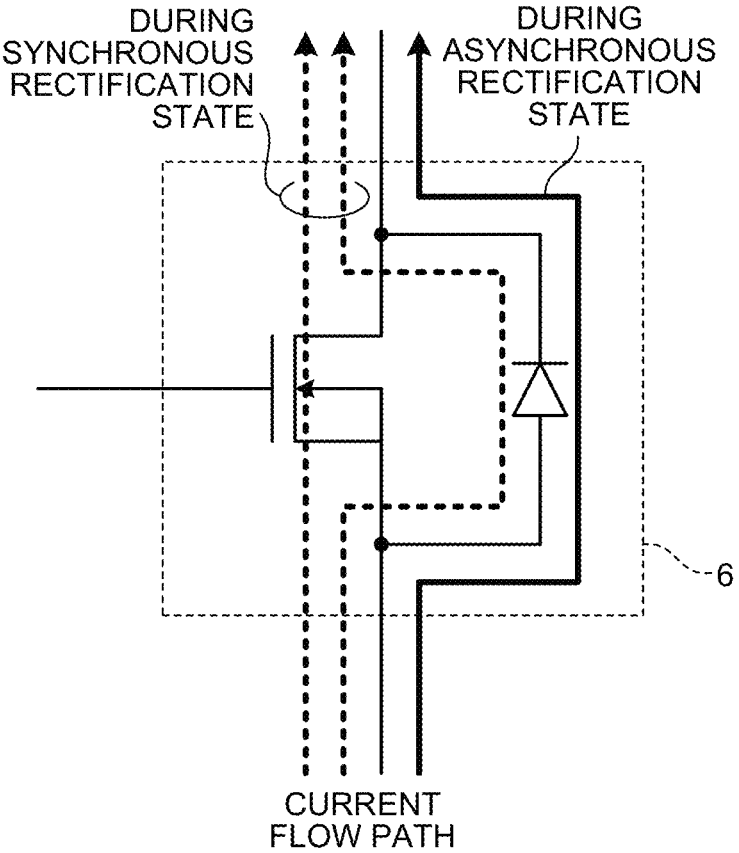
FIG. 5 is a first diagram for explaining a control method by the gate drive circuitry according to the embodiment.
Figures 6, 7:
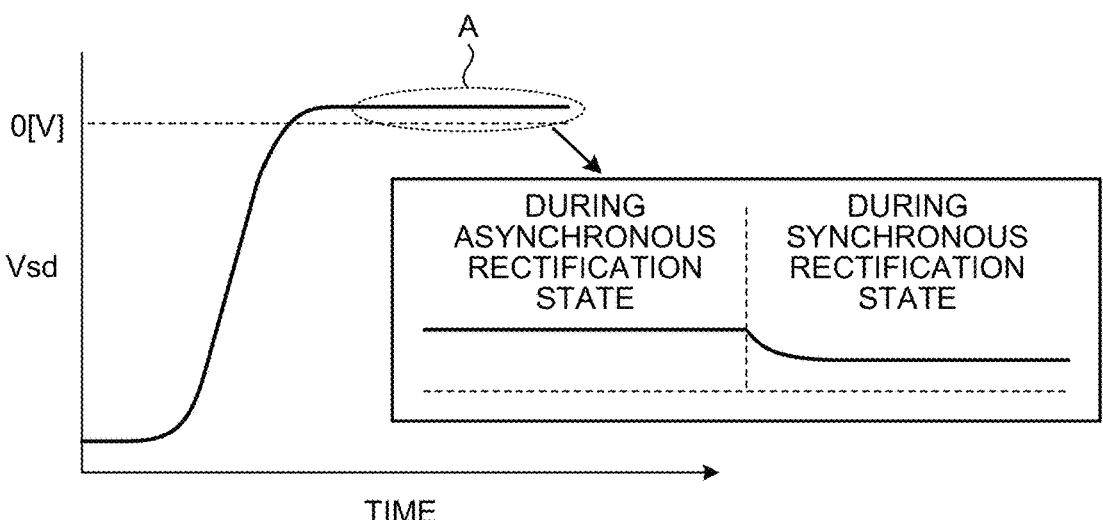
FIG. 6 is a second diagram for explaining the control method by the gate drive circuitry according to the embodiment.
FIG. 7 is a view illustrating an example of a Vsd table used in control of the gate drive circuitry according to the embodiment.

Next, a control method by the gate drive circuitry 10 according to the embodiment will be described with reference to the drawings of FIGS. 1 to 7 as appropriate. FIG. 4 is a diagram illustrating an example of the drive signal CS generated by the gate drive circuitry 10 according to the embodiment. FIG. 5 is a first diagram for explaining a control method by the gate drive circuitry 10 of the embodiment. FIG. 6 is a second diagram for explaining the control method by the gate drive circuitry 10 of the embodiment. FIG. 7 is a view illustrating an example of a Vsd table used in the control of the gate drive circuitry 10 according to the embodiment.

First, in a case where the power conversion main circuitry is, for example, a switching power supply circuitry or a converter circuitry, a control method may be used in which the semiconductor switching element connected in parallel to the antiparallel diode is turned ON in accordance with a timing at which a current flows through the antiparallel diode. This control method is called synchronous rectification control. A voltage drop caused by a current flowing through a transistor element unit of the semiconductor switching element is smaller than a voltage drop caused by the current flowing through the antiparallel diode or the parasitic diode. Therefore, if the synchronous rectification control is performed, a circuit loss during a period in which a reflux current flows can be reduced, so that a loss in the power conversion main circuitry can be reduced, and operation efficiency of the power converter can be enhanced.

Further, without limiting to the inverter circuitry 2 of the embodiment, the drive signal CS for driving the semiconductor switching elements 6 of the upper and lower arms of the inverter circuitry 2 is provided with a pause period for giving an OFF command to any of the semiconductor switching elements 6 of the upper and lower arms. This pause period is referred to as a dead time. FIG. 4 illustrates an example of the dead time provided in the drive signal CS. During this dead time period, both the semiconductor switching elements 6 of the upper and lower arms are in the OFF state. The dead time is provided to reliably prevent a short circuit between the DC buses 16 and 17 in FIG. 3.

An operation during the dead time period will be described using the U-phase in FIG. 3 as an example. In FIG. 3, when the semiconductor switching element 6UP of the U phase upper arm transitions from the ON state to the OFF state, transition is made to the dead time. During this dead time period, as described above, the semiconductor switching element 6UN of the U-phase lower arm is also in the OFF state. A current flowing through the semiconductor switching element 6UP of the upper arm flows through the antiparallel diode incorporated in the semiconductor switching element 6UN of the lower arm so as not to lose a place to go. This current is a reflux current.

As described above, during the dead time period, the reflux current does not flow through the transistor element unit of the semiconductor switching element 6, and the reflux current flows through the antiparallel diode. Therefore, the operation during the dead time period is identical to the operation at a time when the synchronous rectification control is not performed. Therefore, this state is referred to as an "asynchronous rectification state" in this description. Further, conversely, a state in which the synchronous rectification control is performed is referred to as a "synchronous rectification state".

Note that, FIG. 3 illustrates a case where the inverter circuitry 2 has two levels. However, even in a case where the inverter circuitry 2 has three levels, there is a period during which the reflux current flows through the antiparallel diodes or the parasitic diodes of the semiconductor switching elements of the upper and lower arms. Therefore, even in the case where the inverter circuitry 2 has three levels, synchronous rectification control can be performed. When the synchronous rectification control is performed, the operation efficiency of the power converter can be enhanced similarly to the case of the two levels.

In FIG. 5, a current flow path when the semiconductor switching element 6 is in the asynchronous rectification state is indicated by a solid line, and a current flow path when the semiconductor switching element 6 is in the synchronous rectification state is indicated by a broken line. As illustrated in FIG. 5, in the asynchronous rectification state, the reflux current flows only through the antiparallel diode of the semiconductor switching element 6. Note that, it is needless to say that the reflux current also flows through the parasitic diode when the semiconductor switching element 6 includes the parasitic diode. Further, in the synchronous rectification state, the reflux current flows through both the transistor element unit and the antiparallel diode of the semiconductor switching element 6. Needless to say that a reflux current also flows through the parasitic diode when the semiconductor switching element 6 includes the parasitic diode.

FIG. 6 illustrates an example of a waveform of the first voltage Vsd which is a voltage between the drain terminal 62 and the source terminal 63 of the semiconductor switching element 6. A horizontal axis represents time, and a vertical axis represents a voltage value of the first voltage Vsd. Since the first voltage Vsd is a voltage of the source terminal 63 based on a voltage of the drain terminal 62, a voltage when the semiconductor switching element 6 is in the ON state is a negative value. On the other hand, a voltage when the semiconductor switching element 6 is in the OFF state is a positive value slightly larger than 0 [V], and progresses at a flat value as indicated by a broken line circle "A" in FIG. 6.

Further, FIG. 6 illustrates a waveform obtained by enlarging the broken line circle "A". The left side is a waveform in the asynchronous rectification state, and the right side is a waveform in the synchronous rectification state. As described above, a current flows only through the antiparallel diode of the semiconductor switching element 6 in the asynchronous rectification state, and a current flows through both the transistor element unit and the antiparallel diode of the semiconductor switching element 6 in the synchronous rectification state. Therefore, as illustrated, a voltage value in the synchronous rectification state is smaller than a voltage value in the asynchronous rectification state.

FIG. 7 illustrates a state in which the memory 4*b* stores a Vsd table 41 in the asynchronous rectification state and a Vsd table 42 in the synchronous rectification state. In addition, junction temperatures Tj1, Tj2, Tj3, . . . , and TjN of the semiconductor switching element 6 are indicated at the first row of each table. Currents Id1, Id2, Id3, . . . , IdN flowing from the source terminal 63 to the drain terminal 62 in the semiconductor switching element 6 are indicated at the first column of each table.

The Vsd table 41, which is a first table, is a table indicating the first voltage Vsd in a correspondence between a first current and a first junction temperature. The first current mentioned here is a current Id flowing from the source terminal 63 to the drain terminal 62 when semiconductor switching element 6 is in the asynchronous rectification state. Further, the first junction temperature here is a junction temperature Tj of the semiconductor switching element 6 when the first current flows through the semiconductor switching element 6.

Further, the Vsd table 42, which is a second table, is a table indicating the first voltage Vsd in a correspondence between a second current and a second junction temperature. The second current mentioned here is the current Id flowing from the source terminal 63 to the drain terminal 62 when the semiconductor switching element 6 is in the synchronous rectification state. Further, the second junction temperature here is the junction temperature Tj of the semiconductor switching element 6 when the second current flows through the semiconductor switching element 6.

A table value, which is a voltage value in each table, can be obtained by measurement in advance before the semiconductor switching element 6 is mounted on the inverter circuitry 2. Each table can be provided for each model of the semiconductor switching element 6, but may be provided for each production lot in order to improve estimation accuracy. In addition, a state of the semiconductor switching element 6 may be divided by accumulated use time, a different table may be prepared for each divided state, and the table to be referred to may be switched according to the state of the semiconductor switching element 6. By doing in this way, the estimation accuracy of the junction temperature Tj and the current Id can be further improved.

In addition, increment widths between the junction temperatures Tj1, Tj2, Tj3, . . . , and TjN do not need to be equal intervals, and may be unequal intervals. This similarly applies to the currents Id1, Id2, Id3, . . . , and IdN. In addition, it is not necessary to obtain all of the table values of the individual tables, that is, the voltage values (Vx11 to Vx1N, Vx21 to Vx2N, Vx31 to Vx3N, . . . , VxN1 to VxNN) in the Vsd table 41 and the voltage values (Vy11 to Vy1N, Vy21 to Vy2N, Vy31 to Vx3N, . . . , VyN1 to VyNN) in the Vsd table 42 by measurement, and the table values may be obtained by arithmetic processing by interpolation processing, extrapolation processing of some measured values.

Next, estimation processing of the junction temperature Tj and the current Id performed by the gate drive circuitry 10 according to the embodiment will be described with reference to FIG. 8. FIG. 8 is a flowchart for explaining the estimation processing of the junction temperature Tj and the current Id performed by the gate drive circuitry 10 of the embodiment.

First, the voltage detection circuitry 5 detects the first voltage Vsd at a first timing at which the semiconductor switching element 6 is in the asynchronous rectification state (step S11). An example of the first timing is any timing during the dead time period. Further, the voltage detection circuitry 5 detects the first voltage Vsd at a second timing at which the semiconductor switching element 6 is in the synchronous rectification state (step S12). An example of the second timing is any timing in a period in which the semiconductor switching element 6 is controlled to be turned ON after an end of the dead time and a reflux current flows through the semiconductor switching element 6. Note that these first and second timings are examples, and are not limited to these examples. When the synchronous rectification control is performed on the semiconductor switching element 6, any timing in a period immediately before the synchronous rectification control may be set as the first timing, and any timing immediately after the synchronous rectification control is performed may be set as the second timing.

The controller 4 acquires a detection value of the first voltage Vsd detected at the first and second timings from the voltage detection circuitry 5 (step S13). Using the two detection values of the first voltage Vsd detected at the first and second timings, the controller 4 performs processing of uniquely identifying the junction temperature Tj of the semiconductor switching element 6 from the Vsd tables 41 and 42 which are the first and second tables (step S14). In addition, the controller 4 performs processing of uniquely identifying the current Id flowing through the semiconductor switching element 6 at the first and second timings from the Vsd tables 41 and 42 which are the first and second tables, by using the two detection values of the first voltage Vsd detected at the first and second timings (step S15).

For example, it is assumed that the detection value of the first voltage Vsd detected in step S11 is Vx33 and the detection value of the first voltage Vsd detected in step S12 is Vy33. In this case, the controller 4 estimates that the junction temperature Tj of the semiconductor switching element 6 is "Tj3" from both tables. In addition, the controller 4 estimates that the current Id flowing through the semiconductor switching element 6 is "Id3" from both tables. Even if both the Vsd tables 41 and 42 are generated with fine temperature increments and current increments, it is naturally assumed that the voltage values in both tables do not match. In such a case, two or more sets of the junction temperature Tj and the current Id corresponding to the detection value of the first voltage Vsd detected at the first timing or a voltage value having a value close to the detection value are extracted from the Vsd table 41. Similarly, two or more sets of the junction temperature Tj and the current Id corresponding to the detection value of the first voltage Vsd detected at the second timing or a voltage value having a value close to the detection value are extracted from the Vsd table 42. Then, the junction temperature Tj and the current Id may be uniquely identified from the candidate values of the junction temperature Tj and the current Id extracted from both tables. Any method may be used as the method for uniquely identifying the junction temperature Tj and the current Id. As an example, it is conceivable to prioritize the junction temperature Tj and the current Id, and to set a candidate value having a larger value as an estimation value so as to be a safer side estimation value.

The estimation value of the junction temperature Tj specified in step S14 can be used to predict life and remaining life of the semiconductor switching element 6. The life and the remaining life are predicted using a known method.

Further, the estimation value of the current Id specified in step S15 can be used for controlling the semiconductor switching element 6. For example, the estimation value of the current Id is compared with a threshold value A, and control is performed to stop the operation of the gate driver 3 when the estimation value of the current Id exceeds the threshold value A. By doing in this way, the semiconductor switching element 6 can be prevented from being damaged by an overcurrent.

Note that, in the control example described above, when the estimation value of the current Id exceeds the threshold value A, the operation of the gate driver 3 is immediately stopped, but the present disclosure is not limited to this example. A threshold value B having a value smaller than the threshold value A may be set, and the estimation value of the current Id may be compared with the threshold value B. In this case, the controller 4 counts the number of times the estimation value of the current Id exceeds the threshold value B, and can perform control to issue a warning or stop the operation of the gate driver 3 in accordance with the number of times the estimation value of the current Id exceeds the threshold value B. By doing in this way, it is possible to prevent the semiconductor switching element 6 from being damaged by an overcurrent while grasping a deterioration state of the semiconductor switching element 6.

As described above, according to the gate drive circuitry 10 of the embodiment, the controller 4 includes the first table and the second table. The first table is a table indicating the first voltage, which is a voltage between the drain terminal and the source terminal, in a correspondence between a first current and a junction temperature. The first current flows from the source terminal to the drain terminal when the semiconductor switching element is in an asynchronous rectification state, and the junction temperature is of the semiconductor switching element when the first current flows in the semiconductor switching element. The second table is a table indicating the first voltage in a correspondence between a second current and a junction temperature. The second current flows from the source terminal to the drain terminal when the semiconductor switching element is in a synchronous rectification state, and the junction temperature is of the semiconductor switching element when the second current flows in the semiconductor switching element. The voltage detection circuitry detects the first voltage at a first timing at which the semiconductor switching element is in the asynchronous rectification state. Further, the voltage detection circuitry detects the first voltage at a second timing at which the semiconductor switching element is in the synchronous rectification state. The controller performs processing of uniquely identifying at least one of a junction temperature of the semiconductor switching element or a current flowing through the semiconductor switching element at the first and second timings from the first and second tables, by using two detection values of the first voltage detected at the first and second timings. As a result, it is possible: to accurately estimate a temperature of the semiconductor switching element or a current flowing through the semiconductor switching element; and to drive the semiconductor switching element.

Note that the first timing described above can be any timing in the dead time provided in a drive signal for driving the semiconductor switching element. In addition, the second timing described above can be any timing in a period in which the semiconductor switching element is controlled to be turned ON after an end of the dead time and a reflux current flows through the semiconductor switching element. By doing in this way, it is possible to estimate a temperature of the semiconductor switching element or a current flowing through the semiconductor switching element during driving of the motor as a load, without providing a special operation mode.

Further, the controller may uniquely identify a current flowing through the semiconductor switching element at the first and second timings to obtain an estimation value, compare the estimation value with a threshold value, and perform control to stop an operation of the gate driver in a case where the estimation value exceeds the threshold value. By doing in this way, the semiconductor switching element can be prevented from being damaged by an overcurrent.

Further, the controller may uniquely identify a current flowing through the semiconductor switching element at the first and second timings to obtain an estimation value, compare the estimation value with a threshold value, and perform control to issue a warning or stop an operation of the gate driver in accordance with the number of times the estimation value exceeds the threshold value. By doing in this way, it is possible to prevent the semiconductor switching element from being damaged by an overcurrent while grasping a deterioration state of the semiconductor switching element.

In addition, by using the method of the first embodiment, it is possible to accurately estimate a temperature of the semiconductor switching element without using a temperature sensor or a current flowing through the semiconductor switching element, and drive the semiconductor switching element. In a case of using a temperature sensor, in order to solve the problem of a temperature difference that may occur between a temperature of the semiconductor switching element and a detection value of the temperature sensor, it is necessary to provide the temperature sensor for each semiconductor switching element and to provide sensor wiring connecting each temperature sensor and the controller for each semiconductor switching element. Therefore, the method of using the temperature sensor has a problem of leading to an increase in manufacturing cost. Whereas, by using the method of the first embodiment, it is not necessary to use the temperature sensor, so that the manufacturing cost of the power converter can be reduced.

Note that, the configurations illustrated in the above embodiment illustrate one example and can be combined with another known technique, and it is also possible to omit and change a part of the configuration without departing from the subject matter.

REFERENCE SIGNS LIST 1 power converter; 2 inverter circuitry; 3 gate driver; 4 controller; 4*a* processor; 4*b* memory; 5 voltage detection circuitry; 6, 6UP, 6UN, 6VP, 6VN, 6WP, 6WN semiconductor switching element; 6A, 6B, 6C leg; 10 gate drive circuitry; 16, 17 DC bus; 41, 42 Vsd table; 50 DC power supply; 52 motor; 61 gate terminal; 62 drain terminal; 63 source terminal.

The invention claimed is:

1. A gate drive circuitry configured to drive a semiconductor switching element: including a gate terminal; a drain terminal and a source terminal; and incorporating at least one of an antiparallel diode or a body diode, the gate drive circuitry comprising:

a voltage detection circuitry configured to detect a first voltage that is a voltage between the drain terminal and the source terminal;

a controller configured to generate a drive signal for driving the semiconductor switching element; and a gate driver configured to generate a drive voltage for driving the semiconductor switching element based on the drive signal and apply the drive voltage to the gate terminal, wherein the controller includes:

a first table that is a table indicating the first voltage in a correspondence between a first current and a junction temperature, the first current flowing from the source terminal to the drain terminal when the semiconductor switching element is in an asynchronous rectification state, and the junction temperature being of the semiconductor switching element when the first current flows in the semiconductor switching element; and a second table that is a table indicating the first voltage in a correspondence between a second current and a junction temperature, the second current flowing from the source terminal to the drain terminal when the semiconductor switching element is in a synchronous rectification state, and the junction temperature being of the semiconductor switching element when the second current flows in the semiconductor switching element, the voltage detection circuitry is configured to:

detect the first voltage at a first timing at which the semiconductor switching element is in the asynchronous rectification state; and detect the first voltage at a second timing at which the semiconductor switching element is in the synchronous rectification state, and the controller is configured to:

perform processing of uniquely identifying at least one of a junction temperature of the semiconductor switching element and a current flowing through the semiconductor switching element at the first and second timings from the first and second tables, by using two detection values of the first voltage detected at the first and second timings.

2. The gate drive circuitry according to claim 1, wherein the first timing is any timing in a dead time provided in the drive signal, and the second timing is any timing in a period in which the semiconductor switching element is controlled to be turned ON after an end of the dead time and a reflux current flows through the semiconductor switching element.

3. The gate drive circuitry according to claim 2, wherein the controller is configured to:

uniquely identify a current flowing through the semiconductor switching element at the first and second timings to obtain an estimation value;

compare the estimation value with a threshold value; and perform control to stop an operation of the gate driver in a case where the estimation value exceeds the threshold value.

4. A power converter comprising:

the gate drive circuitry according to claim 3; and a power conversion main circuitry having at least one semiconductor switching element that is driven by the gate drive circuitry.

5. The gate drive circuitry according to claim 2, wherein the controller is configured to:

uniquely identify a current flowing through the semiconductor switching element at the first and second timings to obtain an estimation value;

compare the estimation value with a threshold value; and perform control to issue a warning or stop an operation of the gate driver in accordance with a number of times the estimation value exceeds the threshold value.

6. A power converter comprising:

the gate drive circuitry according to claim 5; and a power conversion main circuitry having at least one semiconductor switching element that is driven by the gate drive circuitry.

7. A power converter comprising:

the gate drive circuitry according to claim 2; and a power conversion main circuitry having at least one semiconductor switching element that is driven by the gate drive circuitry.

8. The gate drive circuitry according to claim 1- or 2, wherein the controller is configured to:

uniquely identify a current flowing through the semiconductor switching element at the first and second timings to obtain an estimation value;

compare the estimation value with a threshold value; and perform control to stop an operation of the gate driver in a case where the estimation value exceeds the threshold value.

9. A power converter comprising:

the gate drive circuitry according to claim 8; and a power conversion main circuitry having at least one semiconductor switching element that is driven by the gate drive circuitry.

10. The gate drive circuitry according to claim 1, wherein the controller is configured to:

uniquely identify a current flowing through the semiconductor switching element at the first and second timings to obtain an estimation value;

compare the estimation value with a threshold value; and perform control to issue a warning or stop an operation of the gate driver in accordance with a number of times the estimation value exceeds the threshold value.

11. A power converter comprising:

the gate drive circuitry according to claim 10; and a power conversion main circuitry having at least one semiconductor switching element that is driven by the gate drive circuitry.

12. A power converter comprising:

the gate drive circuitry according to claim 1; and a power conversion main circuitry having at least one semiconductor switching element that is driven by the gate drive circuitry.

* * * * *